United States Patent [19]

Quinn

[11] 3,968,083

[45] July 6, 1976

[54] NOVEL POLYETHERIMIDES

[75] Inventor: Clayton B. Quinn, Scotia, N.Y.

[73] Assignee: General Electric Company, Schenectady, N.Y.

[22] Filed: Feb. 27, 1975

[21] Appl. No.: 553,659

[52] U.S. Cl. ............... 260/47 CP; 260/46.5 E; 260/49; 260/50; 260/78 TF; 260/326 D; 260/326 A; 260/326 S; 260/326 E; 428/287; 428/435; 428/443; 428/458; 428/474

[51] Int. Cl.² ........................................ C08G 73/10

[58] Field of Search ....... 260/47 CP, 46.5 E, 78 TF, 260/49, 326 D, 326 A, 326 S, 326 E, 65, 50

[56] References Cited
UNITED STATES PATENTS

| | | | |
|---|---|---|---|
| 3,833,546 | 9/1974 | Takekoshi et al. | 260/47 CP |
| 3,847,867 | 11/1974 | Heath et al. | 260/47 CP |
| 3,850,885 | 11/1974 | Takekoshi et al. | 260/47 CZ |
| 3,875,116 | 4/1975 | Heath et al. | 260/47 CP |

*Primary Examiner*—Lester L. Lee
*Attorney, Agent, or Firm*—Joseph T. Cohen; Jerome C. Squillaro

[57] ABSTRACT

This invention is concerned with a new class of polyetherimides. More particularly, the invention is concerned with polyetherimides derived from the reaction of an organic diamine and a class of dianhydrides selected from the class consisting of a bisphenol fluorenone dianhydride and a phenolphthalein dianhydride.

5 Claims, No Drawings

NOVEL POLYETHERIMIDES

This invention is concerned with a new class of polyetherimides. More particularly, the invention is concerned with polyetherimides derived from the reaction of an organic diamine and a class of dianhydrides selected from the class consisting of a bisphenol fluorenone dianhydride and a phenolphthalein dianhydride, wherein the polymer is composed of recurring units of the formula

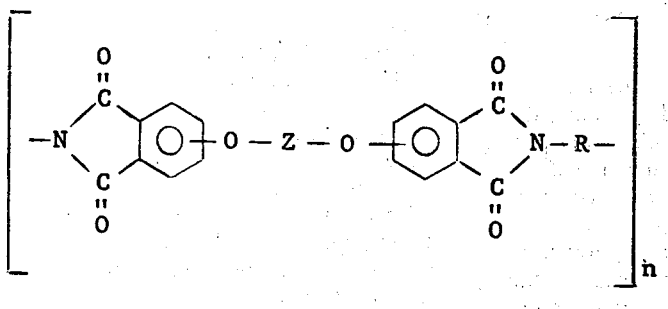

where Z is a member selected from the class consisting of the

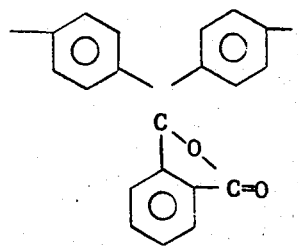

group and the

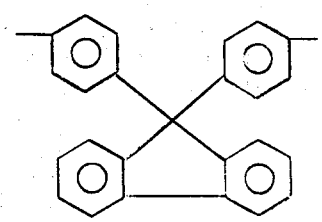

group, R is a divalent organic radical, and n is a whole number in excess of 1, e.g., 10 to 10,000 or more.

The above-described polyetherimides can be made, for example, directly from the reaction of dianhydrides of the formula

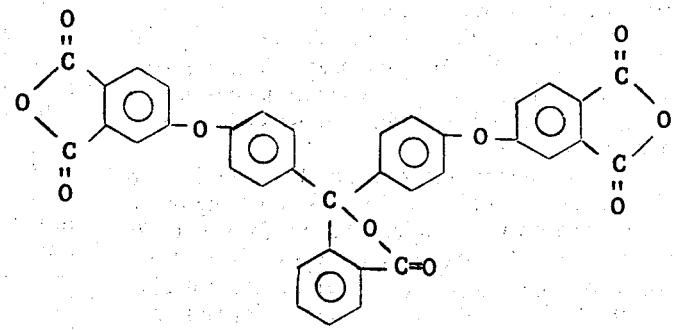

and

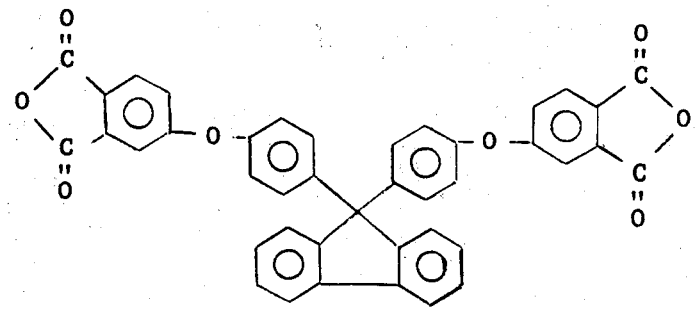

which dianhydrides and method for preparing the same are more particularly disclosed and claimed in my copending application Ser. No. 553,658 filed concurrently herewith and assigned to the same assignee as the present invention. By reference, this copending application is made part of the disclosures and teachings of the instant application. Alternatively, the 3-substituted dianhydrides may replace the 4-substituted dianhydrides referred to above.

Briefly stated, these dianhydrides may be obtained by the reaction of either N-methyl-4-nitrophthalimide or N-methyl-3-nitrophthalimide with the dialkali metal salt of either phenolphthalein or the bisphenol fluorenone having the formula VI 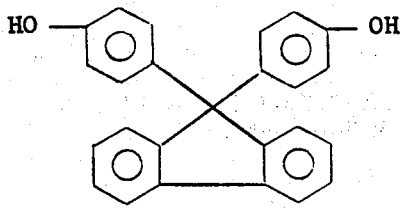

to form the N-methyl bisimide, treating the latter to form the corresponding tetraacid and dehydrating the tetraacid to the corresponding dianhydride. More particular directions for preparing and obtaining the aforesaid two dianhydrides may be found in my aforementioned copending application.

In accordance with my invention, the polyetherimides of formula I can be obtained by reacting the dianhydride of formulas IV or V with a diamino compound of the formula

VII $H_2N-R-NH_2$ advantageously employing a suitable solvent in which to effect interaction. Alternatively, the polyetherimides of the present invention can also be prepared by a melt polymerization whereby the aforesaid class of dianhydrides are reacted with the desired diamino compound of formula VII while heating the mixture of ingredients at elevated temperatures with concurrent intermixing in an apparatus suitable for the purpose such as a Brabender mixing bowl.

In the above diamino compound, R is a divalent organic radical selected from the class consisting of (a) aromatic hydrocarbon radicals having from 6 to 20 carbon atoms and halogenated derivatives thereof, (b) alkylene radicals, $C_{(2-8)}$ alkylene terminated polydiorganosiloxanes, cycloalkylene radicals having from 2 to 20 atoms, and (c) divalent radicals included by the formula

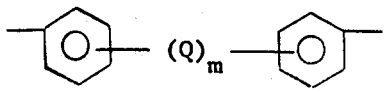

where Q is a member selected from the class consisting of $-O-$,

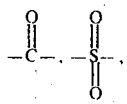

$-S-$, and $-C_xH_{2x}-$, x is a whole number of from 1 to 5, inclusive, and m is 0 or 1. Included among the organic diamines of formula VII are, for example,
m-phenylenediamine;
p-phenylenediamine;
4,4'-diaminodiphenylpropane;
4,4'-diaminodiphenylmethane;
benzidine;
4,4'-diaminodiphenyl sulfide;
4,4'-diaminodiphenyl sulfone;
4,4'-diaminodiphenyl ether;
1,5-diaminonaphthalene;
3,3'-dimethylbenzidine;
3,3'-dimethoxybenzidine;
2,4-bis(β-amino-t-butyl)toluene;
bis(p-β-amino-t-butylphenyl)ether;
bis(p-β-methyl-o-aminopentyl)benzine;
1,3-diamino-4-isopropylbenzene;
1,2-bis(3-aminopropoxy)ethane;
m-xylylenediamine;
p-xylylenediamine;
2,4-diaminotoluene;
2,6-diaminotoluene;
bis(4-aminocyclohexyl)methane;
3-methylheptamethylenediamine;
4,4-dimethylheptamethylenediamine;
2,11-dodecanediamine;
2,2-dimethylpropylenediamine;
octamethylenediamine;
3-methoxyhexamethylenediamine;
2,5-dimethylhexamethylenediamine;
2,5-dimethylheptamethylenediamine;
3-methylheptamethylenediamine;
5-methylnonamethylenediamine;
1,4-cyclohexanediamine;
1,12-octadecanediamine;
bis(3-aminopropyl)sulfide;
N-methyl-bis(3-aminopropyl)amine;
hexamethylenediamine;
heptamethylenediamine;
nonamethylenediamine;
decamethylenediamine;
bis(3-aminopropyl)tetramethyldisiloxane;
bis(4-aminobutyl)tetramethyldisiloxane, etc.,
and mixtures of such diamines.

In the practice of the invention, a mixture of essentially equimolar amounts of the dianhydride of formulas IV and V and the organic diamine of formula VII are heated either in a solvent or if in the form of a melt, heating is conducted until the mixture is at least partially converted to a melt. If employing a melt preparation, stripping along with agitation of the melt, facilitates the eventual removal of any organic diamine which is used in excess of the amount required for polymer formation. Generally, in the melt polymerization technique, temperatures between about 200° to 400°C. and preferably 230° to 300°C. can be employed. When employing a melt polymerization, the order of the addition of the catalyst, which may ordinarily be employed, to the mixture of ingredients of the organic diamine and the dianhydride is not critical.

Although equimolar amounts of the organic diamine and the dianhydride provide for high molecular weight polyetherimides, in certain instances, a slight molar excess (about 1 to 5 mol percent) of the organic diamine can be employed resulting in the production of polyetherimides having terminal amine groups. These polyimides are injection moldable and can be reinforced by fillers, such as silica, carbon, fibers, glass fibers, etc., in which the filler comprises on a weight basis from 20 to 200 parts of filler per 100 parts of polymer.

As pointed out in my aforementioned copending application, the dianhydride of, for instance, formula IV, can be prepared by reacting N-methyl-4-nitrophthalimide with an alkali metal salt of phenolphthalein in a suitable solvent, to give the corresponding 4,4'-bisimide. This bisimide is then hydrolyzed to the corresponding 4,4'-tetraacid by treatment with aqueous sodium hydroxide and water and then heating with aqueous hydrochloric acid, and finally preparing the dianhydride from the tetraacid by treatment with acetic acid and acetic anhydride to form the desired 4,4'-phenolphthalein dianhydride of formula IV.

The dianhydride of bisphenol fluorenone of formula V can be prepared similarly as in the preparation of the dianhydride from phenolphthalein but instead employing the bisphenol fluorenone in place thereof and essentially following the same steps. More particular directions for preparing these two dianhydrides may be found in my aforementioned copending patent application.

The following examples illustrate but do not limit for persons skilled in the art the preparation of polyetherimides from the aforesaid two dianhydrides.

EXAMPLE 1

To a reaction vessel was added 10 grams (0.0156 mol) of the fluorenone dianhydride of formula V, 1.684 grams (0.0156 mol) m-phenylene diamine, 15 ml. toluene, and 20 ml. m-cresol. The reaction mixture was heated at 170°C. for about 12 hours. The viscous solution which was obtained was diluted with chloroform and then precipitated by adding methanol. The white precipitate which was obtained was dried in a vacuum oven at 100°C. to give 10.93 grams of the polyetherimide having the formula by a melt polymerization technique. More particularly, to a Brabender mixing bowl at a temperature of 300°C. under nitrogen was added a well mixed powder containing 50 grams (0.08 mol) of the fluorenone dianhydride of formula V, 8.747 grams (0.081 mol) m-phenylene diamine, and 0.46 gram (approximately 2% by weight) sublimed phthalic anhydride as catalyst. The mixing in the Brabender mixer was allowed to run 10 minutes before the formed polymer was collected. The intrinsic viscosity in m-cresol of the polymer thus obtained, which was composed of recurring units of formula VIII, was 0.50 dl/g. The $T_g$ of the polymer was 282°C.; $TGA_{(N_2)}$=570°C.; and $TGA_{(air)}$=570°C.

The oxygen indices for the polyetherimides prepared from fluorenone dianhydride, whether by solution polymerization or by melt polymerization, were the same, namely, 46 as measured by the method described in U.S. Pat. No. 3,519,697, issued July 7, 1970, column 5, which by reference is made part of the disclosures of the present application. The smoke characteristics of the polyetherimide made by the melt polymerization (Example 1) was found to be equal to 3 (an exceptionally low member) when measured by the $D_m$ as corrected using the NBS smoke chamber more particularly described by D. Gross, J. J. Loftus, and A. F. Robertson, ASTM Special Technical Publication 422 (1969), wherein $D_m$ is the maximum specific optical density corrected for deposit on an optical window.

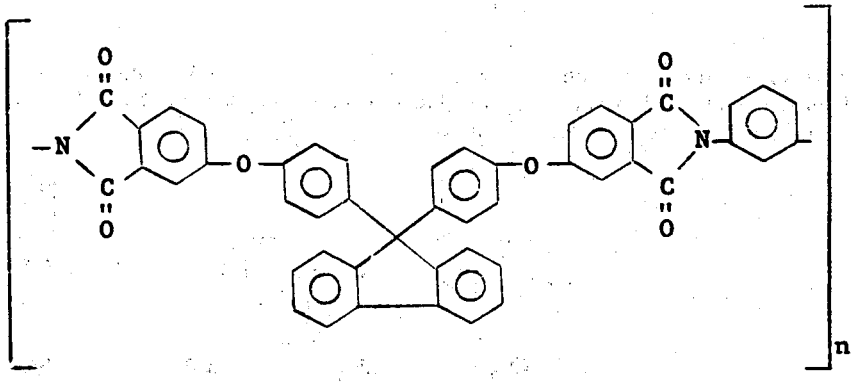

VIII where $n$ is a whole number in excess of 1. This polymer had an intrinsic viscosity $\eta$=0.35 dl/g. when measured in $CHCl_3$; Tg=281°C.; $TGA_{(N_2)}$=570°C.; $TGA_{(air)}$=570°C.

EXAMPLE 2

This example shows ability to make polyetherimides

EXAMPLE 3

A polyetherimide was also prepared from the phenolphthalein dianhydride of formula IV with m-phenylene diamine employing the solution polymerization technique described in Example 1. The polymer thus obtained was composed of recurring units of the formula IX

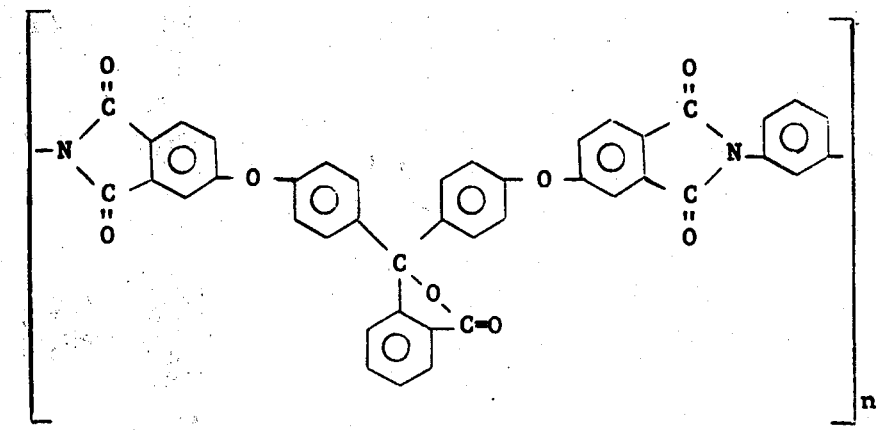

IX where $n$ is a whole number greater than 1. This polymer had an intrinsic viscosity in chloroform $\eta=0.27$ dl/g.; Tg=267°C., TGA$_{(N_2)}$=500°C.; TGA$_{(air)}$=500°C.; an oxygen index=46; and a percent from the TGA at 700°C. in nitrogen of 64% which is exceptionally good. The char value was determined in the manner described by Parker et al in a paper presented at a U.S. Air Force Materials Laboratory conference on February 5–8, 1973, at Las Vegas, Nevada.

EXAMPLE 4

Employing the conditions recited in Example 2, to a Brabender mixing bowl at a temperature of about 300°C. under a nitrogen blanket was added a well mixed powder containing 50 grams (0.082 mol) of the phenolphthalein anhydride of formula IV, 9.303 grams (0.086 mol) m-phenylene diamine, and 0.48 gram (approximately 2%, by weight) of sublimed phthalic anhydride as catalyst. The Brabender was allowed to run 10 minutes at the elevated temperature before the polymeric composition was collected. The intrinsic viscosity of the polymer in m-cresol was $\eta=0.52$ dl/g.; T$_g$=272°C.; TGA$_{(N_2)}$=510°C.; TGA$_{(air)}$=520°C.; oxygen index=44; and a smoke value (D$_m$ corrected)=13. The char value from TGA$_{(N_2)}$ at 700°C. was equal to 62%.

It will of course be apparent to those skilled in the art that in addition to the organic diamine employed in the foregoing examples, other organic diamines of formula VII can be employed without departing from the scope of the invention. The conditions of the reaction can be varied widely and the proportions of ingredients can also be varied depending on the desired molecular weight and the intrinsic viscosity.

It will also be apparent to those skilled in the art that in addition to having recurring units of formula I as the backbone of the polymer, these units can be present concurrently with other units of, for instance, those of the formula

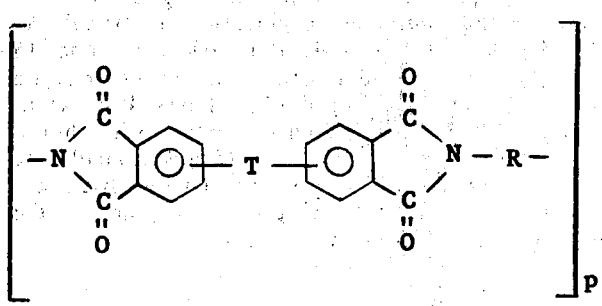

where T may be in the 3- or 4-position on the anhydride residue and is a radical selected from the class consisting of

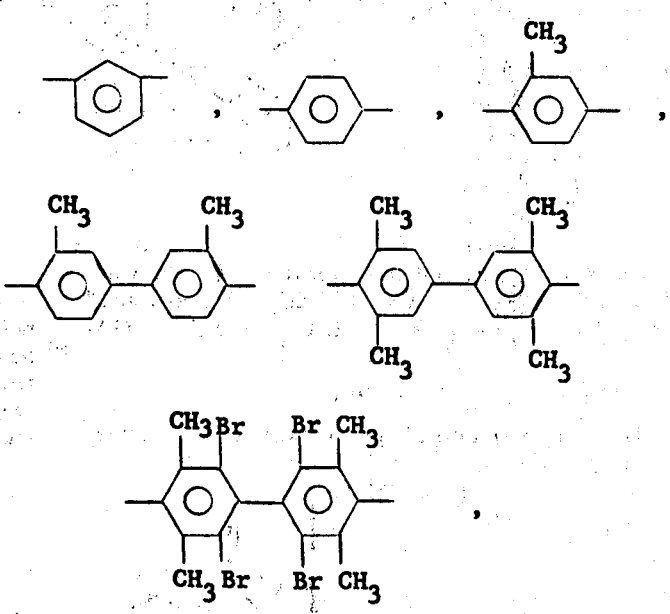

and

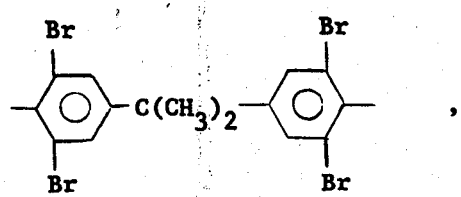

and divalent organic radicals of the general formula

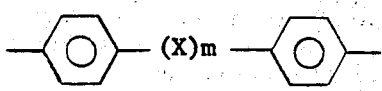

where X is a member selected from the class consisting of divalent radicals of the formulas $-C_xH_{2x}-$,

XIII

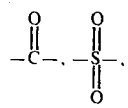

—O— and —S—, where $m$, $x$ and R are as previously defined and p is a whole number in excess of 1. Units derived from formula X may be obtained by interpolymerizing with the dianhydrides of formula IV and V, and the organic diamine of formula VII, a dianhydride of the formula XI 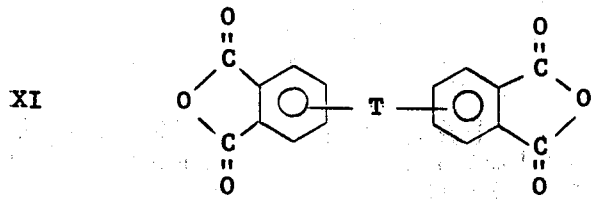

where T has the meaning given above. The presence of the recurring unit of formula X produces copolymers composed of polyimides and polyetherimides.

A still further modification may be obtained by employing dianhydrides of formula XII 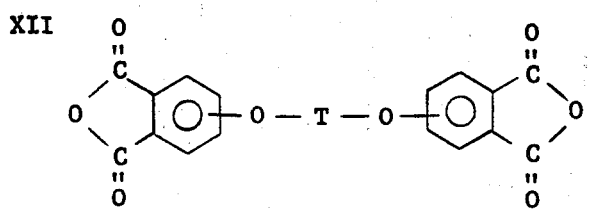

where T has the meaning given above and thus furnishes basis for copolymers of mixed polyetherimides.

Finally, it should be recognized that whereas a good part of the disclosures and teachings of the instant invention have been directed to polymers in which 4-substitution is described in the anhydride residue, it is also intended to have polyetherimides included wherein the substitution in the anhydride residue is in the 3-position. This can be exemplified by the use of anhydrides of the formula

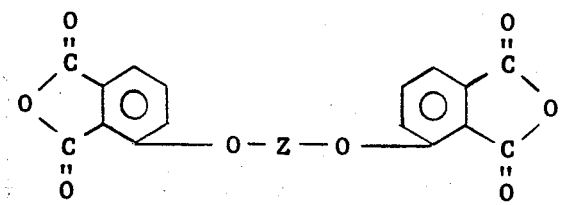

which in turn when coreacted with the organic diamine would give recurring structural units alone or copolymerized of the formula XIV 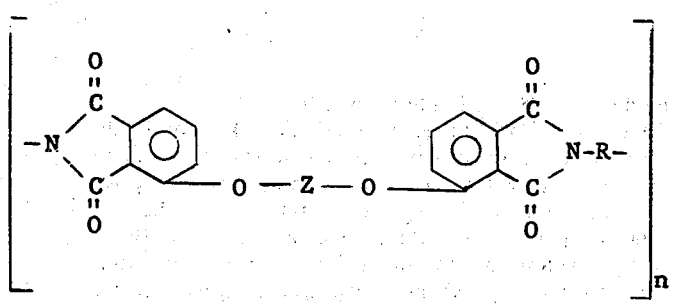

where Z, R, and n have the meanings given above.

The compositions of the present invention have application in a wide variety of physical shapes and form, including the use as films, molding compounds, coatings, etc. When used as films or when made into molded products, these polymers, including laminated products prepared therefrom, not only possess good physical properties at room temperature but they retain their strength and excellent response to workloading at elevated temperatures for long periods of time. Films formed from the polymeric compositions of this invention may be used in application where films have been used previously. Thus, the compositions of the present invention can be used in automobile and aviation applications for decorative and protective purposes, and as high temperature electrical insulation for motor slot liners, in transformers, as dielectric capacitors, as coil and cable wrappings (form wound coil insulation for motors), for containers and container linings, in laminating structures where films of the present composition or where solutions of the claimed compositions of matter are applied to various heat-resistant or other type of materials such as asbestos, mica, glass fiber and the like and superposing the sheets one upon the other and thereafter subjecting them to elevated temperatures and pressures to effect flow and cure of the resinous binder to yield cohesive laminated structures. Films made from these compositions of matter can also serve in printed circuit applications.

Alternatively, solutions of the compositions herein described can be coated on electrical conductors such as copper, aluminum, etc., and thereafter the coated conductor can be heated at elevated temperatures to remove the solvent and to effect curing of the resinous composition thereon. If desired, an additional overcoat may be applied to such insulated conductors including the use of polymeric coatings, such as polyamides, polyesters, silicones, polyvinylformal resins, epoxy resins, polyimides, polytetrafluoro-ethylene, etc. The use of the curable compositions of the present invention as overcoats on other types of insulation is not precluded.

Applications which recommended these resins include their use as binders for asbestos fibers, carbon fibers, and other fibrous materials in making brakelinings. In addition, molding compositions and molded articles may be formed from the polymeric compositions in this invention by incorporating such fillers as asbestos, glass fibers, talc, quartz, powder, wood flour, finely divided carbon, silica, into such compositions prior to molding. Shaped articles are formed under heat, or under heat and pressure in accordance with practices well known in the art. In addition, various heat-resistant pigments and dyes may be incorporated as well as various types of inhibitors depending on the application intended.

The compositions herein defined may be suitably incorporated with other materials to modify the properties of the latter or in turn they may be modified by the incorporation of the materials, for example, they may be compounded with substances such as natural or synthetic rubbers, synthetic resins such as phenolaldehyde resins, alkyd resins, etc.; cellulosic materials such as paper, organic esters of cellulose such as cellulose acetate, cellulose ether; etc. Because of the favorable oxygen index and low smoke index, the incorporation of these polymers in other polymers which may not be so favorably disposed, for instance, polycarbonate resins, polyphenylene oxide resins, polybutylene terephalate resins, etc. in amounts ranging from 5 to 75%, by weight, based on the total weight of the polyetherimides and the aforesaid resins, can improve the properties of the resins in which the polyetherimides of the present invention are incorporated.

What I claim as new and desire to secure by Letters Patent of the United States is:

1. A polyetherimide corresponding to the formula

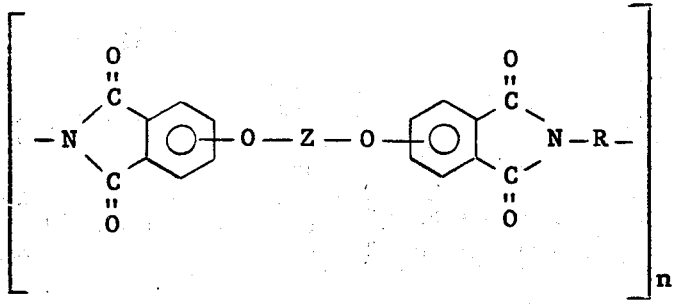

where $n$ is a whole number greater than 1, R is a divalent organic radical selected from the class consisting of (a) aromatic hydrocarbon radicals having from 6–20 carbon atoms and halogenated derivatives thereof, (b) alkylene radicals, $C_{(2-8)}$ alkylene terminated polydiorganosiloxanes, cyclo-alkylene radicals having from 2–20 carbon atoms, and (c) divalent radicals included by the formula

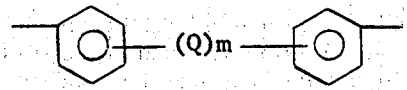

where Q is a member selected from the class consisting of —O—,

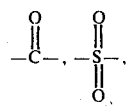

—S—, —$C_xH_{2x}$ where $x$ is a whole number from 1 to 5 inclusive, $m$ is 0 or 1, and Z is a member selected from the groups

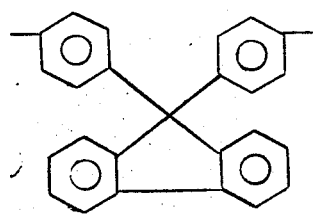 and 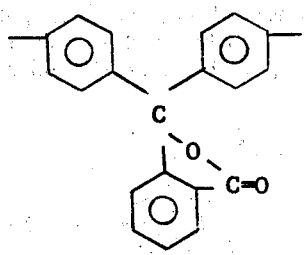

2. A polyetherimide composed of recurring structural units of formula

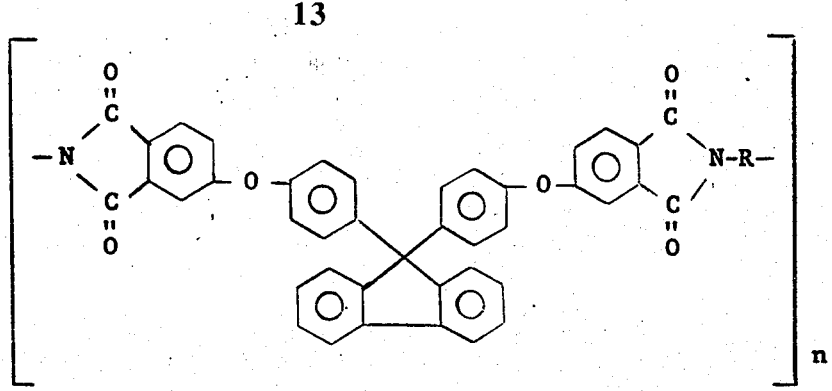

where R is a divalent organic radical selected from the class consisting of (a) aromatic hydrocarbon radicals having from 6–20 carbon atoms and halogenated derivatives thereof, (b) alkylene radicals, $C_{(2-8)}$ alkylene terminated polydiorganosiloxanes, cyclo-alkylene radicals having from 2–20 carbon atoms, and (c) divalent radicals included by the formula

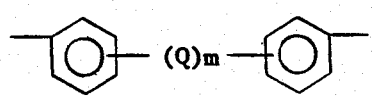

where Q is a member selected from the class consisting of —O—,

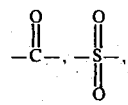

—S—, —$C_xH_{2x}$— where $x$ is a whole number from 1 to 5 inclusive, $m$ is 0 or 1, and $n$ is a whole number greater than 1.

3. A polyetherimide composed of recurring structural units of formula

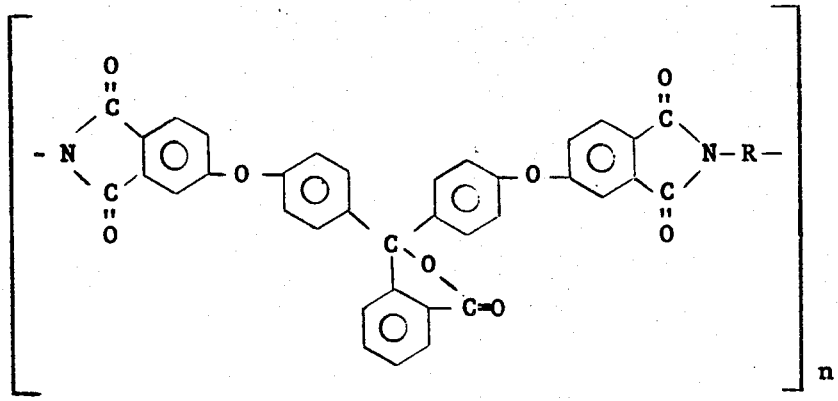

where R is a divalent organic radical selected from the class consisting of (a) aromatic hydrocarbon radicals having from 6–20 carbon atoms and halogenated derivatives thereof, (b) alkylene radicals, $C_{(2-8)}$ alkylene terminated polydiorganosiloxanes, cyclo-alkylene radicals having from 2–20 carbon atoms, and (c) divalent radicals included by the formula

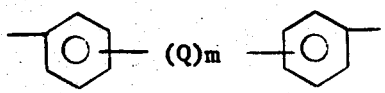

where Q is a member selected from the class consisting of —O—,

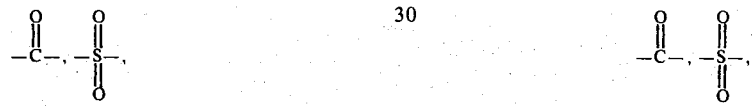

—S—, —$C_xH_{2x}$—, where $x$ is a whole number from 1 to 5 inclusive, and $m$ is 0 or 1, and $n$ is a whole number greater than 1.

4. A polyetherimide composed of recurring structural units of the formula

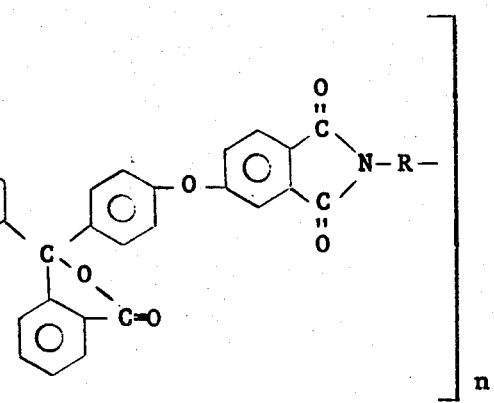

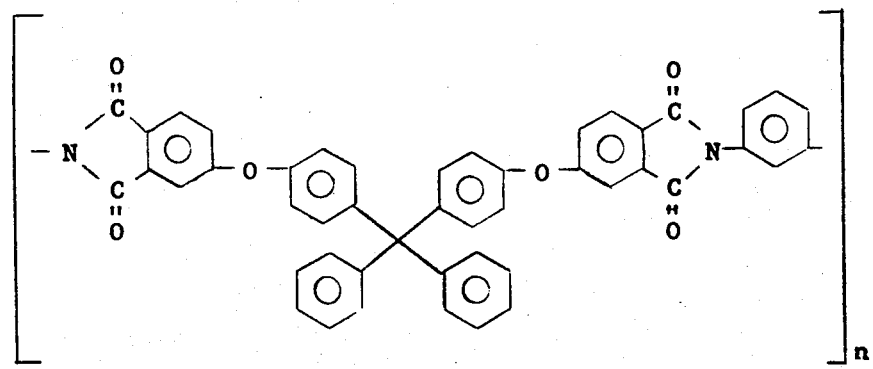

where *n* is a whole number greater than 1.
5. A polyetherimide composed of recurring structural units of the formula
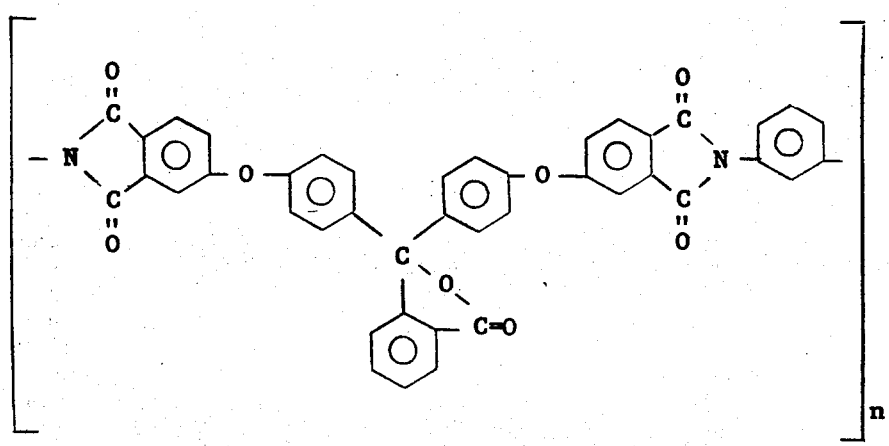
where *n* is a whole number greater than 1.